United States Patent [19]

Gerdes et al.

[11] Patent Number: 4,521,227
[45] Date of Patent: Jun. 4, 1985

[54] AIR WASHER FOR PAINT SPRAY BOOTH

[75] Inventors: Donald F. Gerdes, Park Ridge; Steve E. Telchuk, Wheeling, both of Ill.

[73] Assignee: Binks Manufacturing Company, Franklin Park, Ill.

[21] Appl. No.: 576,561

[22] Filed: Feb. 3, 1984

[51] Int. Cl.³ .............................................. B01D 47/00
[52] U.S. Cl. ...................................... 55/225; 55/226; 55/241; 261/109; 98/115.2
[58] Field of Search ................. 55/226, 230, 231, 240, 55/241, 225; 98/115 SB; 261/109, 62, 44 B

[56] References Cited

U.S. PATENT DOCUMENTS

| 3,018,847 | 1/1962 | Stanly ................................. 55/241 |
| 3,138,647 | 6/1964 | Krantz ................................. 55/241 |
| 3,884,654 | 5/1975 | de Creroisier et al. ............... 55/225 |
| 4,002,441 | 1/1977 | Johnson .............................. 55/226 |
| 4,328,012 | 5/1982 | Telchuk et al. .................. 55/241 X |
| 4,345,921 | 8/1982 | Gustavsson et al. ............. 55/241 X |

Primary Examiner—Charles Hart
Attorney, Agent, or Firm—Gary, Juettner & Pyle

[57] ABSTRACT

Improved air washer or scrubber for a center draw, down draft paint spray booth is disclosed which results in twenty percent (20%) or greater improvement in cleaning and removal of entrained matter from the exhaust air. The air washer may be adjusted to accommodate different air flow requirements, for example, for conventional or electrostatic spray painting. The adjustment may be made manually, by power devices, or automatically to accommodate the changed air flow desired.

18 Claims, 7 Drawing Figures

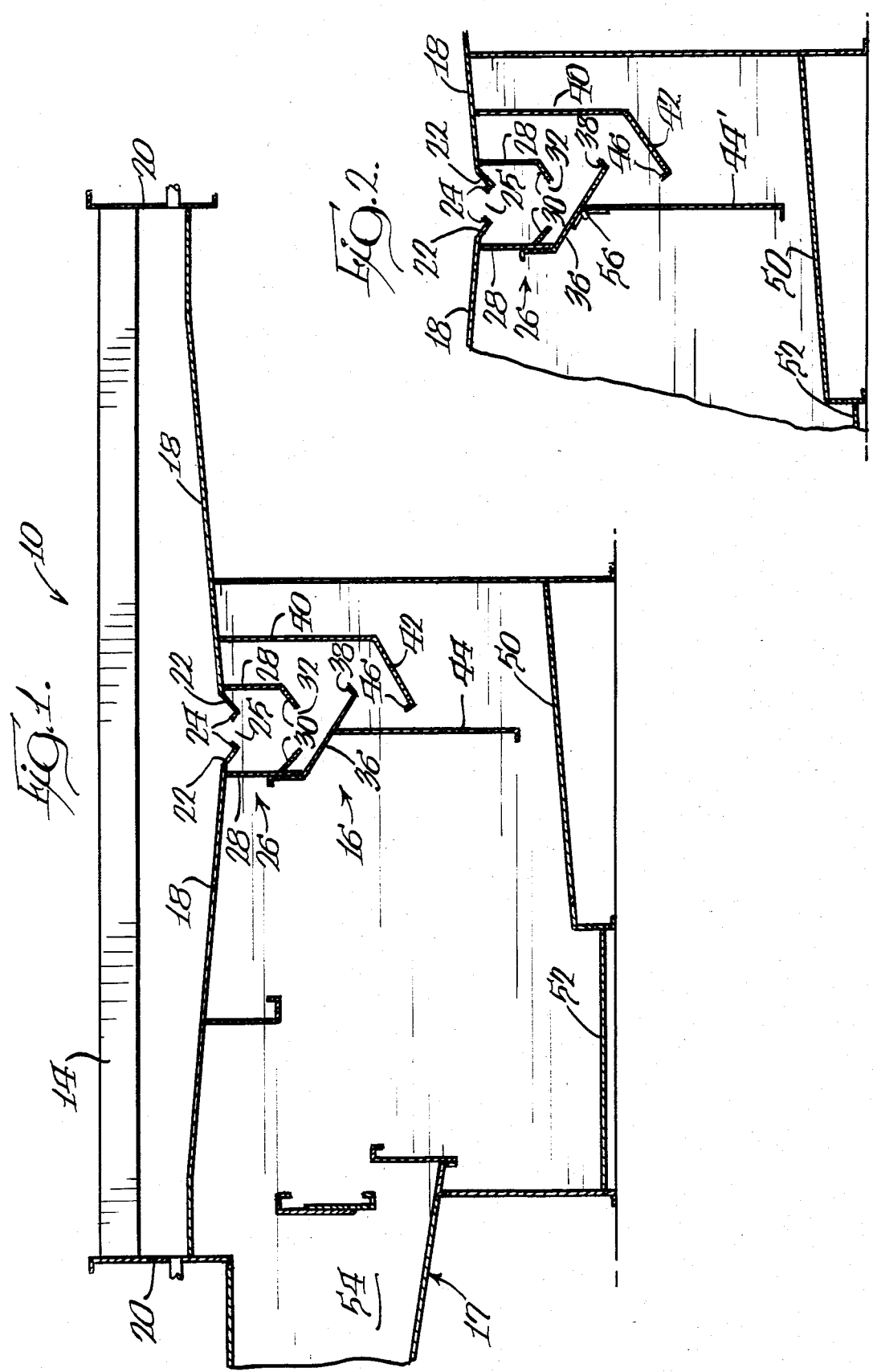

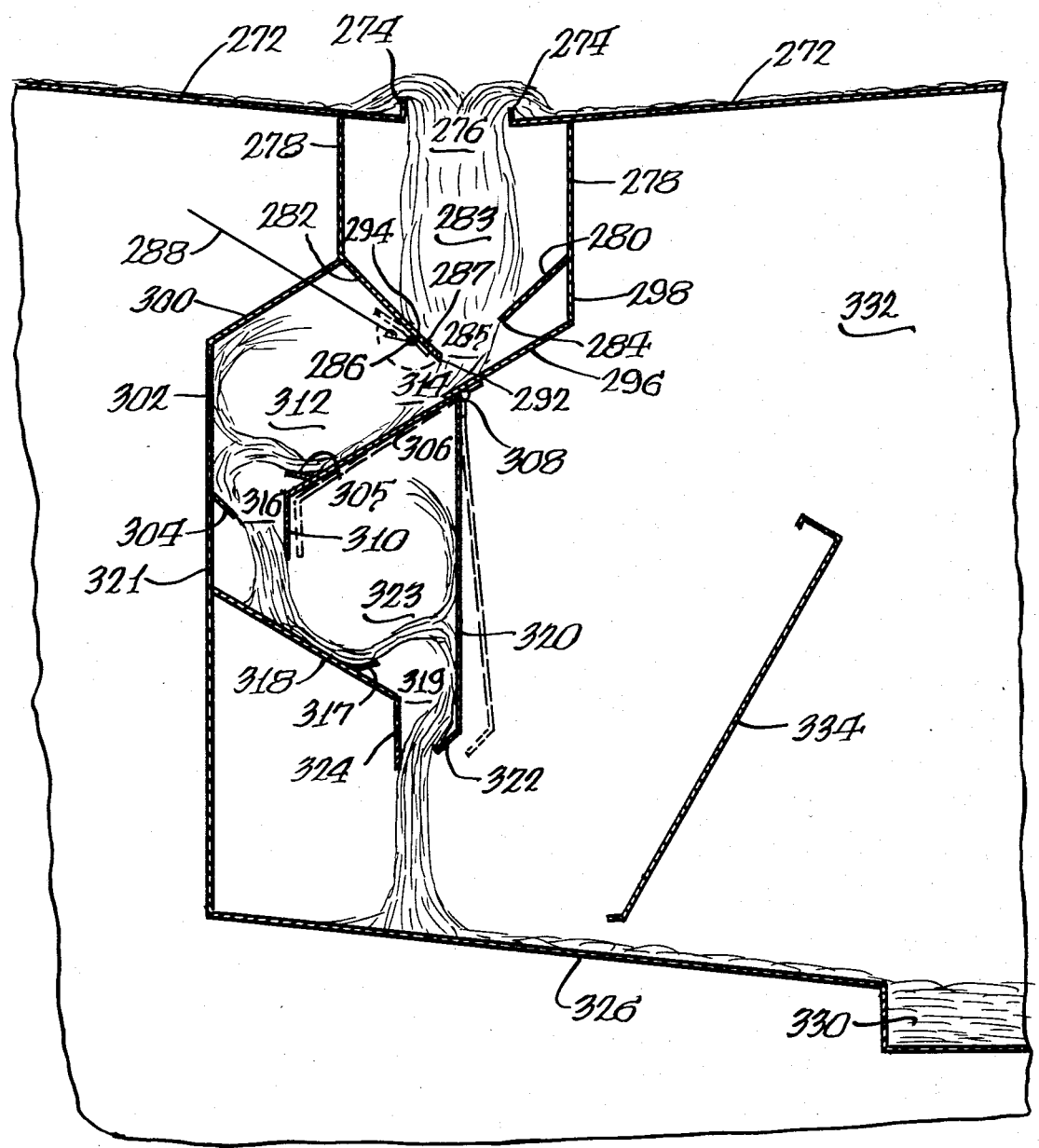

AIR WASHER FOR PAINT SPRAY BOOTH

BRIEF DESCRIPTION OF THE INVENTION

This invention relates to paint spray booths, and particularly to improved air washers or scrubbers for paint spray booths accommodating different air flows that may be desired, for example, for conventional and electrostatic spray painting. The invention comprises, in particular, improvements on the spray booth disclosed in our prior U.S. Pat. No. 4,328,012.

BRIEF DESCRIPTION OF THE PRIOR ART

Paint spray booths are well known in the art and comprise, generally, a spray chamber in which the ware is to be spray painted, an air inlet system for supplying fresh, filtered air to the spray chamber, an exhaust system including an exhaust fan for drawing air through the air inlet and the spray chamber and discharging the air to atmosphere, and exhaust air filtering or cleansing means in the exhaust system upstream from the fan for removing paint overspray entrained in the exhaust air prior to discharge of the air to atmosphere. Well known forms of air cleansing means include water flooded washers or scrubbers for washing the paint particles out of the exhaust air, so that only clean air is discharged to the atmosphere. The water used for the washing is cleansed and filtered, and recirculated through the washers.

In a center draw, down draft, water wash booth the fresh air enters through the ceiling of the spray chamber, flows generally vertically downward through the spray chamber and a grille floor for the chamber, and is exhausted vertically downward through a slot or a series of apertures located along the centerline of a water washed subfloor underlying the grille floor, the water from the subfloor overflowing into the slot or apertures to effect and/or assist in the air washing function.

Prior art spray booths of the center draw, down draft type having air washers somewhat similar to that of the present invention are shown in U.S. Pat. Nos. 4,328,012; 3,795,093; 4,257,784; and 4,345,921.

It is known in the spray booth art to use a greater air flow for conventional, compressed air spray painting and a lesser air flow for electrostatic spray painting. One of the reasons that such lesser air flow is permissible is that with electrostatic spray painting there is less overspray, and thus, a reduced requirement for ventilation of the spray chamber. For example, as suggested in our prior U.S. Pat. No. 4,328,012, for conventional spray painting, the booth's ventilating air flow is generally on the order of 2,000 cubic feet per minute (cfm) per linear foot of booth length, with an air flow velocity of about 100 feet per minute (fpm) through the booth's work chamber, whereas for electrostatic spray painting preferred specifications call for 1,200 cfm and 60 fpm, respectively. As was suggested in U.S. Pat. No. 4,328,012, width of an exhaust air slot in the washer can be adjusted to achieve air cleaning at each of the two desired air flows. Other patents showing spray booths having means for adjusting or regulating the flow of air therethrough, as by adjustable baffles, for various purposes, include U.S. Pat. Nos. 3,182,977; 3,347,024; 3,390,400; 3,596,671; 3,884,654; 4,045,524; 4,177,716; 4,223,599; 4,261,256 and 4,350,506.

SUMMARY OF THE INVENTION

The present invention provides an improved air washer for a paint spray booth of the type shown in U.S. Pat. No. 4,328,012, which substantially increases air cleansing efficiency. In addition, the present invention provides improved means for adjusting air flow slots in the washer to accommodate different air flows, for example, for conventional and electrostatic spray painting, while maintaining air cleansing efficiency, and discloses means for automatically adjusting the air flow slots for such purposes.

One object of the present invention is to provide an air washer for a paint spray booth which can be adjusted for conventional or electrostatic spray painting, with enhanced cleaning action and efficiency.

Still another object of the present invention is to provide a washer for a paint spray booth which adjusts automatically to provide the desired gaps or restrictions for the desired air flow, be it for conventional or electrostatic spray painting or any other purpose.

These and other objects and advantages of the present invention will become apparent from the following detailed description and accompanying drawings.

BRIEF DESCRIPTION OF THE DRAWINGS

FIG. 1 is a cross-sectional view of a paint spray booth having a first embodiment of the improved air washer of the present invention;

FIG. 2 is a partial cross-sectional view of a second embodiment of the improved air washer of the present invention;

FIG. 7 is a view similar to FIGS. 2 through 5 of a sixth and preferred embodiment of the air washer of the invention.

DESCRIPTION OF THE PREFERRED EMBODIMENTS

Figure 3:
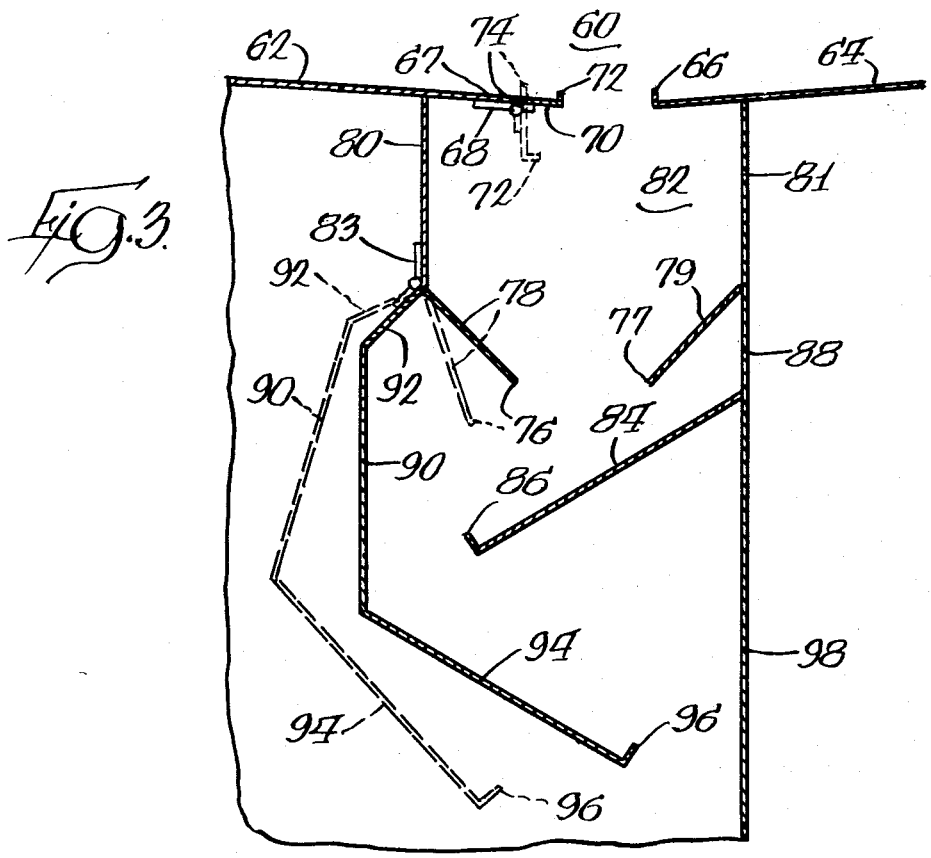
FIG. 3 is a view similar to FIG. 2 of a third embodiment of the washer of the invention.

Referring to FIG. 1, the washer of the present invention in its first embodiment is shown in a paint spray booth generally similar to that of FIG. 2 of U.S. Pat. No. 4,328,012. The booth illustrated is of the vertical, down draft, center draw type having a one-sided exhaust. The booth includes a spray or work chamber 10 through which articles to be painted are moved by means of a conveyor (not shown) located generally along the longitudinal centerline thereof. The floor of the chamber on each side of the conveyor is formed of a grating or grille 14 to afford communication between the work chamber 10 and the air washer, which is indicated generally at 16.

The roof or ceiling (not shown) of the booth can be provided with fresh air inlets (not shown) to provide a uniform flow of ventilating air downwardly through the work chamber and the grille floor, and thence through the air washer 16 and out an exhaust system, which may be either a two-sided system or a one-sided system 17 as shown in FIG. 1. For conventional spray painting, the rate of flow of ventilating air through the spray chamber 10 generally is in the order of 2,000 cubic feet per minute (cfm) per linear foot of booth, at a uniform velocity of about 100 feet per minute (fpm). However, for other forms of spray painting, the air flow and velocity may be increased or decreased, for example, to 1,200 cfm and 60 fpm, respectively, for a rotary bell electrostatic spray painting system.

The washer unit 16 is positioned in the center of a water-washed subfloor 18 which is located below the grille floor 14 and slopes downwardly from either side wall 20 of the chamber 10 toward the longitudinal centerline of the booth at an angle in the range, preferably, of 5° to 10° from the horizontal. In the first embodiment, the subfloor 18 is provided at the center of the booth with longitudinally extending generally V-shaped flanges 22 sloping downwardly at an angle in the range, preferably, of about 35° to 45°, which terminate in upturned lips 24 spaced from each other to form a first slot 25 extending lengthwise of the booth. The present washer operates successfully with a first slot that is preferably about 8 inches wide and up to 10 inches wide, if desired, for conventional spray painting operations. For such operations, an 8 inch wide slot at 25 produces an air velocity therethrough in the order of 3,000 fpm.

To prevent paint overspray from the spray painting operation accumulating on the subfloor 18, and to provide the required washing liquid for the washer 16, the subfloor is flooded continuously by washing liquid (herein referred to for convenience as being water) flowing inwardly over the subfloor 18 from the side walls 20 toward the center of the booth, down the V-shaped flanges 22 and against the lips 24, which lips extend essentially perpendicular to the flanges 22 and thereby "kick" the water upwardly and inwardly so as to completely cover the slot 25 with a dense curtain or layer of water. When air from the chamber 10 is drawn downwardly through this curtain of liquid, a dense, sponge-like, aerated mass of liquid is formed which effectively removes from the air and entrains in the liquid most of the paint particles in the exhaust air, with a very high efficiency.

For even greater efficiency, the mass of air and water discharging downwardly through the first slot 25 enters into an expansion chamber 26 formed by spaced, downwardly extending, side walls 28 and downwardly converging bottom walls 30, the lower edges of which are spaced from each other to form a second slot 32 extending lengthwise of the booth so as to be directly below and generally contiguous with the slot 25. Slot 32 preferably is provided with adjustment means (such as disclosed in U.S. Pat. No. 4,328,012 or as disclosed in FIG. 6 hereof) so as to accommodate variations in the width of slot 32 depending on the air velocity desired through that slot.

As a consequence of this construction, the air and water are accelerated through the first slot 25, then decelerated in the expansion chamber 26 and again accelerated through the second slot 32, thereby causing the air to thoroughly mix with the water and remove contaminants from the air. Also, impingement of the air on the water washed surfaces of the flanges 22 and walls 30 appears to contribute to the efficiency of the scrubbing action. If desired, the lower edges of the converging walls 30 could be provided with lips similar to the lips 24. Below the slot 32 a first baffle sheet 36 is provided, and terminates in an upturned lip 38 which cause the water descending along the sheet 36 to be thrown upwardly onto an auxiliary wall 40, to provide another curtain of water and a further washing action, in the manner described in our U.S. Pat. No. 4,328,012.

A first improvement provided by the present invention resides in the provision of a second baffle sheet 42 which, in this instance, extends from the lower end of the first auxiliary wall 40 at an inclination opposite that of the baffle sheet 36, and a second auxiliary wall 44 which, in this instance, extends vertically downwardly from the first baffle sheet 36 at a desired spacing from the lower terminal end of the baffle sheet 42. Like the first baffle sheet 36, the second baffle sheet 42 terminates in an upturned lip 46 which throws water descending along the second baffle sheet 42 upwardly and against the second auxiliary wall 44, thereby to provide an additional water curtain and additional water-washed impingement surfaces to aid in removing particulate matter from the air. While the addition of the second baffle sheet 42 and the second auxiliary wall 44 may seem simple, and could be expected to produce a slight increase in cleaning efficiency, it was also anticipated that the same could cause detrimental increases in the pressure losses through the system, thereby requiring larger exhaust fans and greater power consumption, that would outweigh the advantages of any slight increase in cleaning. However, while there was some increase in pressure losses, there was a much greater than expected increase in cleaning. Overall, with the improved baffling provided by the addition of the second baffle sheet 42 and second auxiliary wall 44, there was a surprising twenty-eight percent (28%) reduction in emissions from the exhaust system of the spray booth as compared with the washer as previously constructed.

In use, the washer operates as follows: Paint laden air from the work chamber 10 is drawn downwardly toward the water-washed subfloor 18 and at an accelerating rate of speed, through the curtain of water formed by the lips 24, through the first slot 25. The air and the water, which has now entrained most of the paint particles, decelerates into the expansion chamber 26 and is again accelerated through the second slot 32. The mixture of air and water then impinges against the first baffle sheet 36, and the air again expands. The water flows down the first baffle sheet 36 and is kicked upwardly so as to form a sheet of wash water across the slot between that sheet and the first auxiliary wall 40. The mixture of air and water again impinges, now against the second baffle sheet 42, and the air again expands. The water flows down the second baffle sheet 42 and is thrown upwardly so as to form another sheet of water across the slot between the second baffle 42 and second auxiliary wall 44. Another cleaning action occurs as the air is drawn downwardly through this sheet of water. A final cleaning action occurs as the water drops downwardly off the second auxiliary wall 44 to the sloping bottom floor 50, and the air is drawn through this last water curtain. Thereafter the water is carried away by the trough 52 to be treated, cleansed and recirculated. The cleaned air separates from the water in the large volume chamber above the trough 52, and is exhausted through exhaust chamber 54.

Referring to FIG. 2, a second embodiment of the air chamber of the invention is shown, which is generally similar to that shown in FIG. 1. Identical reference numerals are used for the corresponding parts in FIGS. 1 and 2. The principal difference between the embodiments of FIGS. 1 and 2 is that the second auxiliary wall 44′ has been hingedly mounted, as indicated at 56, to the first baffle sheet 36. This pivot mount facilitates cleaning of the booth and particularly the inner surfaces of the second auxiliary wall 44' and the second baffle sheet 42, the second auxiliary wall 44' being movable away from the sheet 42 to increase access. Also, the hinged wall will permit adjustment of the width of the air washing slot defined between the terminal end of the baffle 42 and the wall 44' for purposes presently to be described.

Referring to FIG. 3, a third embodiment of the improved washer of the present invention is shown installed in a booth having a work chamber 60 and a water-washed subfloor comprised of left and right hand subfloor members 62 and 64. The right subfloor 64 terminates in a fixed upturned lip 66. The left subfloor 62 terminates at 67 and has mounted thereon, by a hinge 68, a pivotable lip defining member 70. The pivotable member 70 terminates at its rightmost end in an extended lip 72. When in its upper position, shown in solid lines, the member 70 lies even with the subfloor 62 and the lip 72 extends upward generally normal to the subfloor at a spacing, for example, of 5 to 6 inches or less from lip 66, thus forming a first washing slot of that width. When the member 70 is pivoted clockwise to its dotted line position, the left end 74 of the member 70 forms a new lip which extends generally perpendicularly upward above the subfloor 62 and is spaced, for example, 8 to 10 inches from the lip 66, thus opening up the first slot to such greater width.

In either position, the lip 72 or 74 defined by the member 70 acts like lip 66 to retain water coverage on the respective water-washed subfloor 62 or 64, and to cause water flowing thereover to cover the first slot with a dense sheet or layer of water. In addition, when in its lower, dotted line position, the member 70 and tip 72 would intercept some of the water cascading from the first slot to further intermix the air, water and overspray. If desired, a similar pivotable member (68, 70, 72) could also be fitted to the right subfloor 64, to accommodate further variations in the width of said first slot.

The member 70 may be held in its large slot (dotted line) position by gravity or latch means (not shown) and in its smaller slot (solid line) position by associated latch means (not shown) conventional in the sheet metal arts.

A second slot is provided between the tips 76 and 77 of a pair of inclined converging bottom walls 78 and 79 carried by side walls 80 and 81. The side walls 80 and 81, bottom walls 78 and 79 and the included underside portions of the subfloors 62 and 64 form an expansion chamber 82, much like expansion chamber 26 in FIG. 1. However, in FIG. 3, the left bottom wall 78 of the expansion chamber is not fixed in position, but is pivotally mounted on the side wall 80 by a hinge 83 so as to be movable between a first position shown in solid lines and a second position shown in dotted lines. Thus, when the bottom wall 78 is in its solid line position, the second slot is of a relatively small dimension, and when the wall is in its dotted line position, the slot is of a greater dimenson. The left bottom wall 78 may be held in the desired one of its two positions by conventional latch means (not shown), or may automatically seek its own adjusted position dependent on the rate of air flow through the washer, as will subsequently be described. In operation, the first slot and second slot would be adjusted to their smaller dimensions for lower rates of air flow, e.g., for electrostatic spray painting, and to their larger dimensions for higher rates of air flow, e.g., for conventional air spray painting, thereby to maintain high velocity flow through the slots and high efficiency cleansing of the air at each of the two selected air flow rates.

Located below the second slot 76–77 is a first inclined baffle sheet 84 having an upturned lip 86 at its lower end. In this instance, the first baffle sheet 84 is carried on a downwardly extending portion 88 of the right side wall 81 of the washer. The first baffle sheet 84 cooperates with a first auxiliary wall 90. The upper end 92 of the auxiliary wall 90, which is offset, is attached or secured to the upper end of the pivotal bottom wall 78 so that the walls 78 and 90 pivot together on hinge 83 between a narrow gap position shown in solid lines and a wide gap position shown in dotted lines. When in the solid line position, auxiliary wall 90 and the lip 86 of the baffle 84 form therebetween a third, relatively narrow slot for use, e.g., in electrostatic paint spraying. When the auxiliary wall 90 is pivoted to its dotted line position, this slot opens up to greater dimension, e.g., for conventional spray painting.

A second baffle sheet 94, which is inclined downwardly oppositely of the first baffle sheet 84, is attached to the lower end of the auxiliary wall 90 so as to pivot therewith. The second baffle sheet 94 has at the lower end an upwardly extending lip 96, which, like lip 86, throws water descending along the second baffle sheet 94 up against a second auxiliary wall 98 extending downwardly from the side wall extension 88. In this instance, the elements 81, 88 and 98 are provided by a single vertical wall. When the assembly 78, 90, 94 is in its solid line position, the lip 96 of the second baffle sheet 94 and the second auxiliary wall 98 provide a fourth slot of relatively small dimension, which slot increases to a greater dimension when the assembly is pivoted to its dotted line position. As previously mentioned, latching means (not shown) may be provided to hold the pivotable assembly 78, 90, 94 in either the solid line or dotted line position. Alternatively, by appropriate design of the pivotable assembly and/or the addition of strategically positioned weights, the pivotable assembly could seek its own adjusted position dependent on the differential between (1) the force of gravity and (2) the force generated by the air flow through the washer at a selected rate. Thus, since the assembly is swingably adjustable to any intermediate position, not merely incrementally adjustable, this washer is automatically and infinitely adjustable for any rate of air flow between preselected minimum and maximum rates of air flow.

In operation, in all positions of adjustment of the pivotally adjustable members 70, 78, 90 and 94, the air exhausted from the spray chamber 60 is drawn through a plurality of dense curtains or layers of water and impinged against a plurality of water washed impingement surfaces; the air being alternately accelerated and decelerated as it passes through the washer, and in particular being accelerated as it passes through each water curtain to a velocity (determined by the width of the respective slot) assuring optimal entrainment of particulate matter in the water and thus highly efficient cleansing of the air without imposing undue power requirements on the system exhaust fans. By appropriately adjusting the sizes of the various slots between the respective pairs of slot defining members 66–70, 76–77, 86–90 and 96–98, superb air cleansing efficiencies are achieved for a wide range of air flow rates through the paint spray chamber. Thus, the air flow rate through the spray chamber may be independently selected to achieve particularly desired spray painting objectives, for example, particular degrees of ventilation, particular air flow velocities enhancing the deposition of paint on the ware, etc., without sacrificing the efficiency of the air washer or increasing the discharge of pollutants to the atmosphere. In short, the washer provides highly efficient scrubbing and cleansing of the exhaust air for a wide range of air flow rates through the spray chamber.

Figure 4:
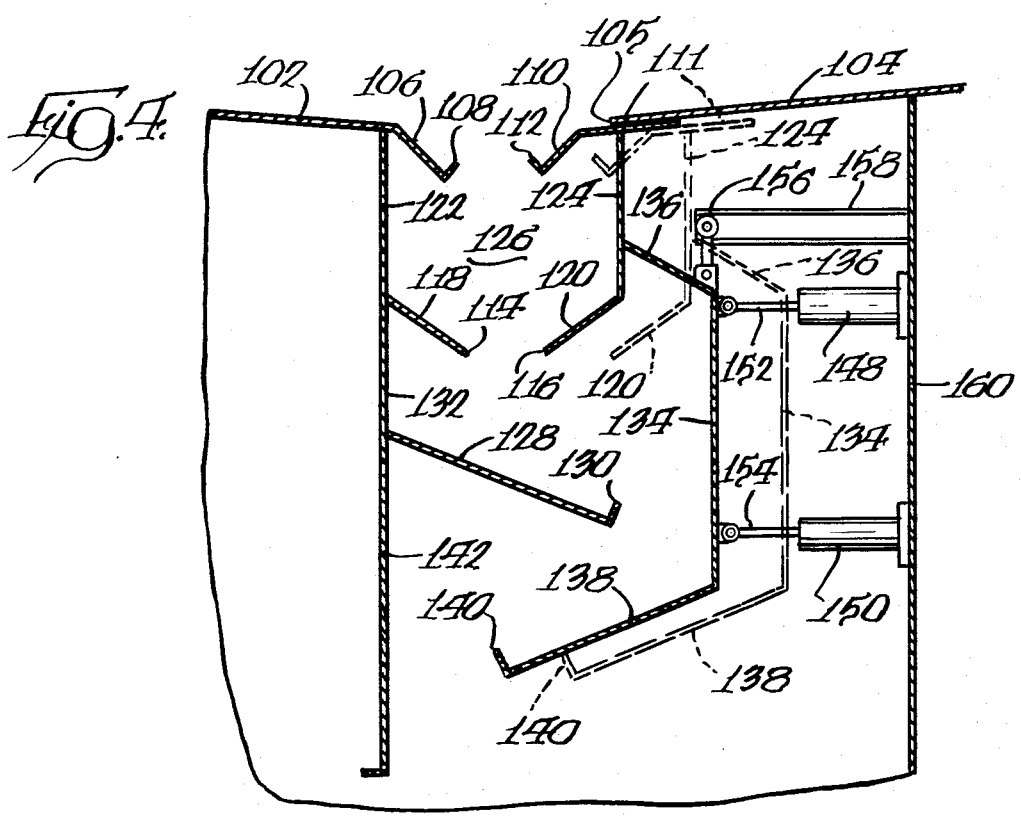
FIG. 4 is a view similar to FIGS. 2 and 3 of a fourth embodiment of the washer.

Another embodiment of the air washer of the invention that is infinitely adjustable between predetermined minimum and maximum air flow requirements is illustrated in FIG. 4. In this embodiment, the left hand members of the air washer are fixed or rigid and the right hand members are interconnected and linearly on slidably adjustable as a unit to vary the width of the slots or restrictions in the washer to any dimension between preselected minimum dimensions, shown in solid lines, and preselected maximum dimensions, shown in dotted lines. If even greater dimensional variation was desired, the left hand members could be similarly constructed and made linearly adjustable.

As illustrated, the left hand subfloor 102 terminates in a fixed, downwardly extending flange 106 having an upturned lip 108. The other subfloor member 104 terminates at 105 adjacent an inclined and downwardly extending, sliding flange 110. The flange 110 has a flat portion 111 parallel to and underlying the subfloor 104 to form a subfloor extension, and an upturned lip 112 at its terminal end. When in its extended position, shown in solid lines, the sliding flange 110 and its lip 112 are spaced a relatively short distance from the fixed lip 108, thus forming a first slot of relatively narrow width. When slid to its retracted, dotted line position, the lip 112 is spaced further apart from the lip 108, thus opening up the first slot to a greater width.

A second washing slot is defined between tips 114 and 116 of a pair of converging bottom walls 118 and 120 carried by side walls 122 and 124. Side wall 122 is carried by subfloor 102 and is fixed in position. Side wall 124 is secured to the sliding flange 110, and is therefore horizontally adjustable with that flange. Thus, bottom wall 118 is fixed in position while bottom wall 120 is movable toward and away from it. The side walls 122 and 124, bottom walls 118 and 120 and the included underside portions of the flanges 106 and 110 form an expansion chamber 126, much like the expansion chamber 26 in FIG. 1. In this embodiment, the first and second slots, defined respectively between the lips 108–112 and tips 114–116, may be of the same size and may, for example, have a minimum width of about 3 to 4 inches and a maximum width of about 8 to 10 inches. In operation, the first and second slots would be set at their smallest widths for electrostatic spray painting, and at their larger widths for conventional spray painting.

A first inclined baffle sheet 128 is located below the second slot and has a upturned lip 130 at its end, the sheet being carried in fixed position on a downwardly extending portion 132 of the left side wall of the washer. The first baffle sheet 128 cooperates with a slidable, first auxiliary wall 134. The upper end 136 of the auxiliary wall 134, which is offset to accommodate full lateral extension of the baffle sheet 128, is attached or secured to the slidable side wall 124 so that they slide or move together. When in the solid line position of adjustment, the first auxiliary wall 134 and the lip 130 form a relatively narrow slot appropriate for electrostatic paint spraying. When the first auxiliary wall 134 is slid to its dotted line position, this slot opens up, for example, for conventional spray painting.

A slidable, inclined, second baffle sheet 138 is secured to the lower end of the slidable auxiliary wall 134 for movement therewith. The slidable, second baffle sheet 138 has an upwardly extending lip 140 which serves to throw water descending along the second baffle sheet 138 up against a fixed, second auxiliary wall 142 extending downwardly from the wall extension 132, and to define a further adjustable air washing slot or restriction between the two.

Members 110, 124, 120, 136, 134 and 138 are thus all secured together to form a single, slidable, horizontally adjustable assembly. This unitary assembly may be moved to any position between its minimum and maximum positions of adjustment either manually or by any desired power operated means. In the FIG. 4 embodiment, the assembly is shown as being moved by a pair of power operators, such as air or hydraulically operated cylinders 148 and 150, having piston rods 152 and 154 connected to the slidable assembly. To carry the weight and stabilize the assembly, the same is supported by a roller track hanger including a roller 156 which moves in a guide track beam 158 secured to rigid structural portions of the booth. In operation, the slidable assembly can be moved from its solid line position to its dotted line position, or to any position in-between, by the power cylinders 152 and 154. The operation of the power cylinders can be manually controlled or automatically initiated by appropriate controls interrelated with the air or hydraulic flow controls.

Figure 5:
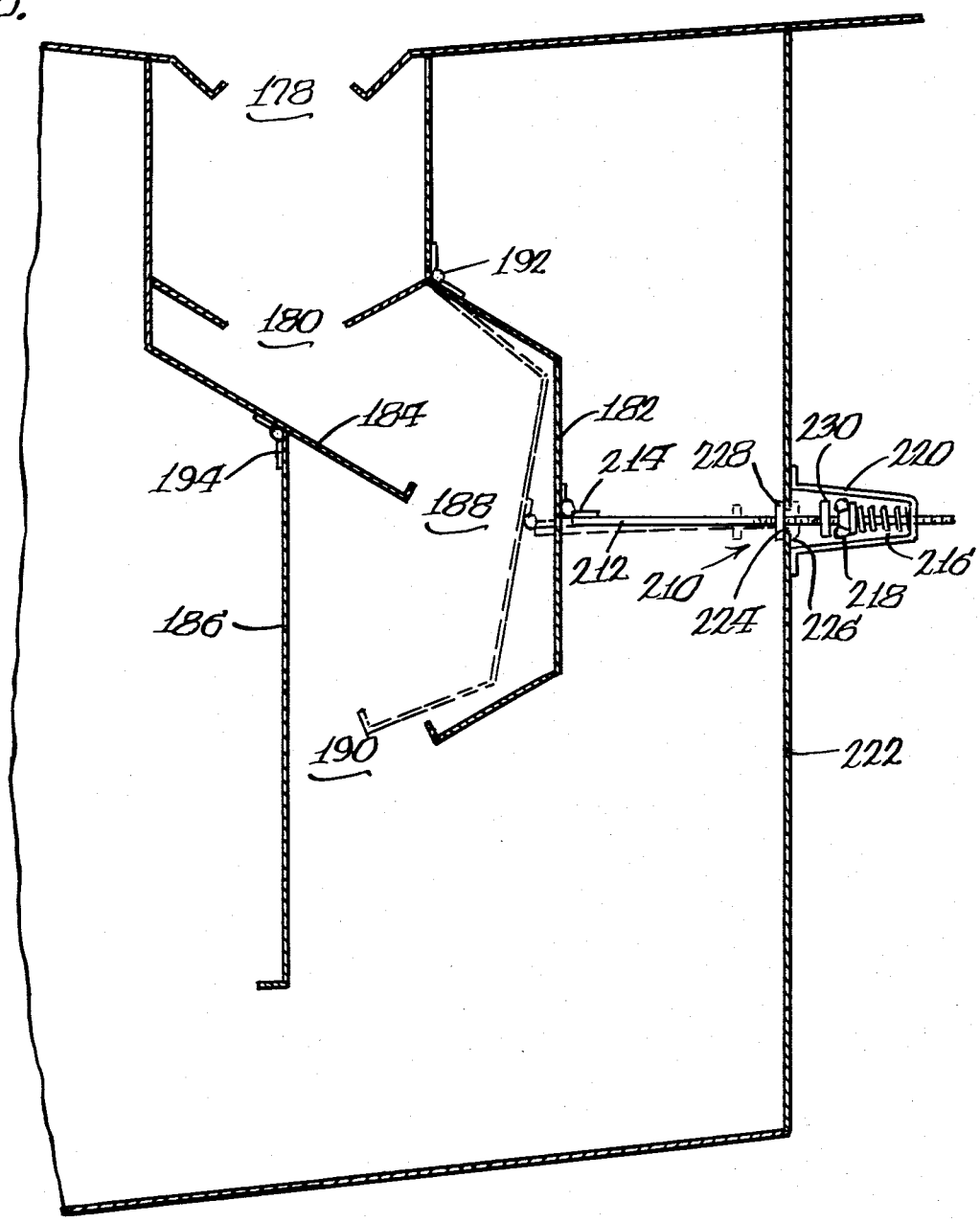
FIG. 5 is a view similar to FIGS. 2, 3 and 4 of a fifth embodiment of the washer.

Referring to FIG. 5, a fifth embodiment of the improved air washer of the present invention is shown as comprising fixed subfloor, flange and expansion chamber members defining first and second air washer slots 178 and 180 of fixed dimensions, and a swingable baffle plate member 182 which serves, with baffle members 184 and 186, to define adjustable third and fourth air washer slots 188 and 190. The swingable baffle plate member 182 may suitably be connected by a hinge 192 to wall portions of the first expansion chamber thereby to be swingably moveable, for example, between the solid and dotted line positions illustrated in FIG. 5. To facilitate further independent adjustment of the width of the fourth washer slot 190, and also to facilitate access to the washer for cleaning and maintenance, the auxiliary wall member 186 may be pivotally connected, as at 194, to the inclined baffle member 184 for movement toward and away from the swingable baffle 182. In this manner, adjustable orifices or slots are conveniently provided for the purpose above discussed.

The feature that distinguishes the FIG. 5 embodiment from the other disclosed embodiments of the invention resides in the provision of means for automatically controlling the width of the adjustable washer slots in response to the rate of flow of air through the washer, i.e., by automatic adjusting means indicated generally at 210. In the illustrated embodiment, the means 210 comprises one or more partially threaded rods 212 pivotally connected at the left end, as by a hinge 214, to the swingable baffle 182. The right ends of the rods engage a biasing means, preferably one or a plurality of longitudinally spaced springs 216, by means of an adjustable stop, such as a wing nut 218 threaded on the rod 212. The other end of the spring 216 engages a generally U-shaped bracket 220 secured to the exterior of the adjacent wall 222 of the spray booth. The rod 212 passes through an opening 224 in the wall 222, and the margin 226 of the opening cooperates with a pair of stops, such as nuts 228 and 230 threaded onto the rod 212, to define the limits of travel of the rod 212, and hence of the swingable baffle 182. As shown in FIG. 5, the stop nut 228 will engage the margin 226 to define the rightmost (solid line) limit of travel, and the stop nut 230 will engage the margin 226 to define the left most (dotted line) limit of travel. The limits may of course be adjusted by turning the stop nuts 228 and 230 on the rod 212. Likewise, threading the adjusting nut 218 inward and outward on the rod 212 will adjust the biasing force provided by the spring 216.

The operation of the automatic adjusting means is as follows: The adjustable stops 218 and 230 are set so that the spring 216 forces the swingable baffle 182 to the left into its dotted line position, when the air flow through the washer is less than a predetermined value, e.g., when the air flow is adjusted for electrostatic spraying. Stop nut 230 is of course adjusted so the baffle 182 will be in the appropriate position to define third and fourth washer slots 188 and 190 of the desired dimensions.

The biasing force generated by the spring means 216 (determined by selecting the spring constant and number of springs 216 used along the length of the booth) is selected so that when the air flow is increased from a predetermined lower level to a predetermined higher level, the pressure differential between the right and left surfaces of the baffle 182 will cause the baffle to move to the right and compress the spring(s) 216, until the leftmost stop nut 224 engages the margin 226 of the wall 222. The nuts 224 is of course adjusted so that the baffle 182 will define third and fourth washer slots 188 and 190 of the desired greater width to accommodate the increased flow of air. Thus, the washer shown in FIG. 5 automatically adjusts to provide efficient air cleansing at each of two predetermined air flow rates. Similar automatic adjustment features could be incorporated in the booths of FIGS. 2, 3 and 7, if desired.

Figure 6:
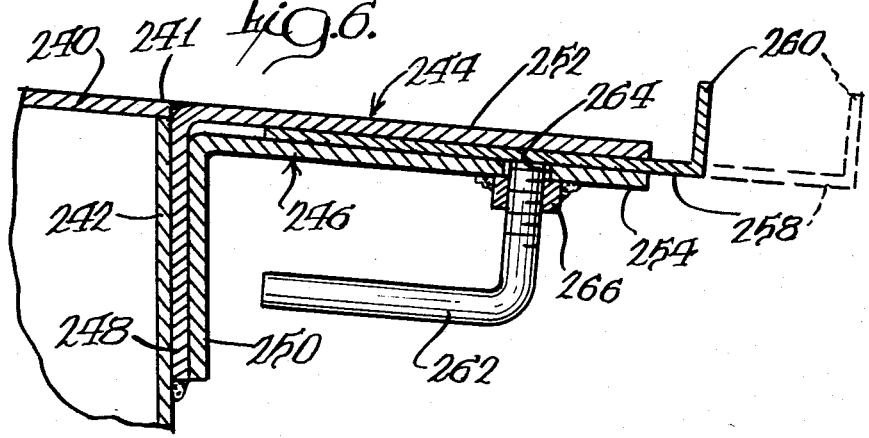
FIG. 6 is a cross-sectional view of an alternative construction suitable for use with any of the booths shown in FIGS. 1 through 5 and 7.

Referring to FIG. 6, we have illustrated an alternative construction for manually adjustable slot defining members which is usable with any of the air washers herein described. As shown in FIG. 6, the subfloor 240 terminates at 241 adjacent a side wall 242 to which are secured a pair of complementary L-shaped members 244 and 246. The L-shaped members have vertical legs 248 and 250 which are secured together and to the wall 242 by means such as welding or bolting. The generally horizontal legs 252 and 254 of the two members are generally parallel and spaced apart for slidable reception therebetween of a slot defining flange member 258. Preferably, the uppermost leg 252 of the L-shaped members is flush with and constitutes a continuation of the subfloor 240, and the flange member 258 has an upturned lip 260 at its exposed end projecting perpendicularly upward above said uppermost leg 252. The flange member 258 may be held in various positions of adjustment by a locking means, in this instance, in the form of one or more bent, threaded rods 262, each of which threadedly engages and passes through a threaded nut 266 secured to the lower surface of the leg 254 and through an opening 264 in the latter leg for engagement with the flange 258. Thus, merely by loosening the several bent rods 262 located along the length of the spray booth, moving the flange 258 to provide the desired slot width, and then retightening the bent rods 262, any slot in the washer of this construction can be adjusted to the air flow desired.

Referring to FIG. 7, a further and preferred embodiment of the improved air washer of the present invention is shown; in which figure the flow of water through the washer has also been depicted. In this structure, the inner, opposed ends of the subfloors 272 terminate in a pair of upturned lips 274, which may be fixed as shown in FIG. 7 or adjustable as shown in FIG. 6. The lips 274 define therebetween a first washing slot covered by a continuous dense layer of water through which air and entrained paint overspray are confined to flow at a predetermined velocity to effect thorough wetting of the particulate matter in the air. Preferably, the first slot is relatively large, e.g., about 8 to 10 inches wide. A pair of side walls 278 extend down from the subfloors 272 and carry a pair of inclined, converging bottom walls 280 and 282. The side walls 278, the included underside portions of the subfloors 272 and the bottom walls 280 and 282 form a first expansion chamber 283, much like expansion chamber 26 in FIG. 1.

The bottom walls 280 and 282 cooperate with one another to form a second washer slot 285 directly below the first slot 276. Bottom wall 282 is provided with an adjustable flap or end portion 286 which is pivotally mounted, as by a hinge 287, to the wall 282. The adjustable portion 286 is connected to an adjusting rod 288 which serves to pivot the adjustable portion to either an extended position (shown in solid lines) or a retracted position (shown in dotted lines). When in the extended position, the second slot 285 is defined between the tip 284 of the right hand bottom wall 280 and the outer edge or tip 292 of the flap or end portion 286. Preferably, the width of the second slot is less than that of the first slot, for example, approximately 4½ inches in the small slot dimension position. When the adjusting rod 288 is retracted, it causes the flap or end portion 286 to swing clockwise, and to fold up next to the bottom wall 282, so that a larger second slot, approximately 7 to 7½ inches in width, is formed between the tips 284 and 294 of the bottom walls 280 and 282.

After passing through the second slot 285 the air and water are impinged at fairly high velocity against and flow along a first inclined baffle sheet 296 located directly below the second slot. In the structure shown, the baffle sheet 296 is carried by and secured to a downwardly extending portion 298 of the right hand washer side wall 278. At the location where the baffle sheet extends below the bottom wall 282 and its flap extension 286, the air and water are again accelerated through a narrow water filled slot 314 defined between the baffle sheet and either the tip 294 of the wall or the tip 292 of its flap extension 286. This third slot is preferably smaller than the second, being in the order of 3 to 4 inches when the flap or wall extension 286 is extended and in the order of 5 to 6 inches when said flap or extension is retracted. After passing through such narrow slot, the air and water are discharged into a large expansion chamber 312 defined by an inclined, upper wall 300 and a vertical side wall which carries a small, downwardly inclined baffle 304. The first baffle sheet 296 includes a first baffle sheet extension 306 which angles downwardly toward the baffle 304 and is movably mounted, as by a hinge 308 secured to the underside of the first baffle sheet 296. The lower end of extension 306 has a small upwardly inclined lip 305 secured thereto, and is then bent to form a downwardly extending flange 310, which is juxtaposed to the baffle 304.

The outlet from the expansion chamber 312 thus takes the form of a fourth adjustable narrow gap or slot 316 defined between the lower end portion 310 of the baffle sheet extension 306 and the small baffle 304 on the wall 302. The width of this fourth adjustable slot 316 is adjusted by pivotal movement of the extension 306 about the hinge 308. The dimensions of the slot 316 in the two positions of adjustment are preferably about the same as the dimensions of the third slot 314.

Upon entry into the expansion chamber 312, the bulk of the water separates from the air and flows along the surface of the baffle sheet extension 306, and is then thrown upwardly by the lip 305 across the slot 316 and against the wall 302. Some of the water is turned upward along the wall 302 into a circular motion within the expansion chamber 312 to wet the walls of the chamber and keep paint off the structure, and also to help entrain any remaining overspray. Most of the water turns downward at wall 302 toward the small inclined baffle 304. The water flows onto the baffle 304 and is again thrown across the slot 316 against the flange 310. Thus, two curtains of water are formed at the slot 316 through which the air must pass in exiting from the chamber 312.

As the air and water exit from the slot 316, the air is decelerated and the water is impinged against, a second downwardly inclined baffle sheet 318 carried by extension 32 of the wall 302. The water discharged from the slot 316 flows down the second baffle sheet 318, which has a lip 317 thereon located a short distance, (e.g., 6 inches) from its lower end. The water flows along the baffle sheet over the lip 317 and is divered upwardly across the top of a further washer slot 319 onto a second auxiliary wall 320. The wall 320 is secured to the baffle extension 306 and is pivotally mounted therewith on the hinge 308. Consequently, the wall 320 is pivotally movable with the extension 306 and its flange 310 to adjust the width of the slot 319 commensurately with the adjustment of the slot 316, for example, from a narrow width (solid lines) of about 3 inches to a larger width (dotted lines) of about 6 inches. To facilitate dimensioning of the slot 319, and also to form another water curtain at the exit of the slot 319, the lower end of the auxiliary wall 320 is preferably bent toward the lower end portion of a vertically depending extension 324 of the baffle sheet 318. Thus, two air washing curtains of water are formed at the slot 319, through which the air is accelerated at a predetermined velocity.

After the final washing by the two curtains of water in the slot 319, the air and water are discharged into a very large volume exhaust chamber 332 wherein the air and water separate; the water (now laden with the paint overspray) dropping to and flowing along a sloped bottom wall 326 to a recycle trough 330, and clean air being drawn off by exhaust means (not shown) from the upper part of the chamber 332. To assist in separation, one or more eliminator baffles 334 may be incorporated in the exhaust chamber 332 if desired.

Thus, in the course of passing through the washer of FIG. 7, exhaust air containing paint overspray is initially accelerated and thoroughly wetted and washed in a spongy mass of air and water which fills the first slot 276; decelerated and expanded in the chamber 283 to aid in entrainment of particulates in the water; again accelerated and washed in a second spongy mass which extends throughout the region of the second slot 285 and the gap 314; again decelerated and expanded in the chamber 312; again accelerated and washed by the two curtains of water formed at the slot 316; again decelerated and expanded in the chamber 323; and yet again accelerated and washed twice by the two curtains of water formed at the slot 319; whereafter the clean air is separated from the paint laden water and exhausted to the atmosphere free of harmful pollutants.

The washing of the air is believed to be achieved principally in the several narrow slots filled with dense masses of water. However, by decelerating the air subsequent to passage through each of the slots 276, 285, 314, 316 and 319, the air expands into expansion chambers or areas wherein the velocity is significantly reduced, so that wetted paint overspray can settle or precipitate out of the air and into the water as a by-product of separating the air from the water prior to the next washing. These multiple washing and separation stages, coupled with the intermittent high velocity impingements of the air against water-washed rigid surfaces, contributes to the high amount of entrained overspray removed from the air by this washer, and the consequent high efficiency of the washer both at high rates of air flow and low rates of air flow.

While several preferred embodiments of the air washers or scrubbers of the present invention have been illustrated and described, it is to be understood that variations, modifications and rearrangements may be made therein without departing from the scope of the invention as defined by the appended claims. Unless specifically recited in the claims, it is to be understood that dimensions given are illustrative only, and that other dimensions may prove suitable.

What is claimed is:

1. In a gas scrubbing device of the down draft type having means for flowing liquid downwardly through the device, means for drawing gas downwardly through the device, means for defining a first scrubber slot for passage therethrough of gas and liquid, an expansion chamber beneath the first slot having downwardly converging bottom walls forming a second scrubber slot below the first slot, a baffle sheet angling laterally downwardly beneath the second slot and cooperating with a spaced apart auxiliary wall to form a third scrubber slot;

the improvement comprising:

a second baffle sheet angling downwardly below the third slot for impingement thereon of gas and liquid and for reception thereon of liquid discharged through the third slot; and a second auxiliary wall extending downwardly below the first baffle sheet opposite the lower end of the second baffle sheet, the lower end of said second baffle sheet being spaced a short distance from said second auxiliary wall and forming therewith a fourth gas scrubber slot, the liquid leaving the first auxiliary wall being collected by said second baffle sheet and impinged thereby against said second auxiliary wall to form at said fourth slot at least one additional curtain of liquid for cleaning additional emissions from the gas.

2. In the gas scrubbing device of claim 1, said second auxiliary wall being movably mounted to facilitate adjustment of the width of said fourth slot.

3. In the gas scrubbing device of claim 1, said second baffle sheet being movably mounted to facilitate adjustment of the width of said fourth slot.

4. In the gas scrubbing device of claim 1, said second baffle sheet being connected to said first auxiliary wall and the two of them being movable mounted for movement toward and away from said second auxiliary wall and said first baffle sheet, respectively, to accommodate adjustment of the widths of said third and fourth slots.

5. In the gas scrubbing device of claim 1, said second auxiliary wall being connected to said first baffle sheet and the two of them being movably mounted for movement toward and away from said second baffle shee and said first auxiliary wall, respectively, to accommodate adjustment of the widths of said third and fourth slots.

6. In the gas scrubbing device of claim 1, one of said first and second auxiliary walls being connected to one of said second and first baffle sheets, respectively, and the two of them being movably mounted to accommodate simultaneous adjustment of the widths of said third and fourth slots.

7. In the gas scrubbing device of claim 6, means for simultaneously moving said connected and movable ones of said auxiliary walls and baffle sheets.

8. In the gas scrubbing device of claim 7, said means for moving comprising power means connected to said connected and movable ones of said auxiliary walls and baffle sheets.

9. In the gas scrubbing device of claim 7, said means for moving comprising biasing means responsive to a first level of gas flow through the device for moving said connected and movable ones of said auxiliary walls and baffle sheets to a first position and responsive to the gas pressure differential created by a second level of gas flow through the device to accommodate pressure activated movement of said connected and movable ones of said auxiliary walls and baffle sheets to a second position.

10. In the gas scrubbing device of claim 6, one of the bottom walls of said expansion chamber being connected to and movable with said connected and movable ones of said auxiliary walls and said baffle sheets to accommodate simultaneous adjustment of the widths of said second, third and fourth slots.

11. In a gas scrubbing device as in claim 1, said first and second baffle sheets and said first and second auxiliary walls carrying means for forming at least two curtains of liquid in each of said third and fourth slots.

12. In a gas scrubbing device of claim 1, the improvement further comprising:
a flap movably mounted on one of said bottom walls for altering the width of said second scrubber slot and the gap spacing between said one bottom wall and said first mentioned baffle sheet.

13. In the gas scrubbing device of claim 12, further comprising an extension on said first baffle sheet, said baffle sheet extension having a lip thereon for throwing liquid relatively upward from said extension, a baffle on said first mentioned auxiliary wall for throwing liquid back toward said extension, said baffle sheet extension and said first mentioned auxiliary wall defining therebetween said third scrubber slot covered by the two curtains of liquid produced by said lip and said baffle.

14. In the gas scrubbing device of claim 13, said first baffle sheet extension and said first auxiliary wall being relatively movable toward and away from one another to accommodate adjustment of the width of said third slot.

15. In the gas scrubbing device of claim 13, said second baffle sheet having a lip thereon for throwing liquid upwardly and outwardly therefrom to form a liquid curtain, and said second auxiliary wall having a baffle thereon for throwing liquid back toward said second baffle sheet to form another liquid curtain, whereby said fourth scrubber slot is covered by said two curtains of liquid produced by the last-named lip and baffle.

16. In the gas scrubbing device of claim 15, said second baffle sheet and said second auxiliary wall being relatively movable toward and away from one another to accommodate adjustment of the width of said fourth slot.

17. In the gas scrubbing device of claim 15, one of said baffle sheets being connected to a respective alternate one of said auxiliary walls, and the connected baffle sheet and auxiliary wall being movably mounted for movement toward and away from their respective associated auxiliary wall and baffle sheet to accommodate simultaneous adjustment of the widths of said third and fourth scrubber slots.

18. In a paint spray booth device of the down draft type having means for flowing liquid downwardly through the device, means for drawing gas downwardly through the device at different gas flow rates for two or more types of spray painting, and means comprising pairs of spaced apart members defining a plurality of scrubber slots in the device through which the liquids and gas are compelled to flow:
the improvement comprising:
means interconnecting into a unitary assembly one member from each of said pairs of members; and
means for moving said assembly as a unit for simultaneously moving all of said one members of each pair toward or away from the companion members of the respective pair and accommodating different gas flow rates for two or more types of spray painting, thereby to simultaneously adjust the width of all of the scrubber slots in the device.

* * * * *